(12) United States Patent
Iechika et al.

(10) Patent No.: US 7,198,374 B2
(45) Date of Patent: Apr. 3, 2007

(54) PRISM STRUCTURE AND PROJECTOR

(75) Inventors: Hisashi Iechika, Shiojiri (JP); Yuji Takado, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 10/511,754

(22) PCT Filed: Jul. 31, 2003

(86) PCT No.: PCT/JP03/09770

§ 371 (c)(1),
(2), (4) Date: Oct. 19, 2004

(87) PCT Pub. No.: WO2004/012007

PCT Pub. Date: Feb. 5, 2004

(65) Prior Publication Data
US 2005/0146689 A1    Jul. 7, 2005

(30) Foreign Application Priority Data
Jul. 31, 2002   (JP)   ............... 2002-223168

(51) Int. Cl.
*G02F 1/1333* (2006.01)
*G03B 21/14* (2006.01)
(52) U.S. Cl. .............. 353/33; 353/81; 349/58
(58) Field of Classification Search .......... 353/81, 353/33, 97; 349/9, 57, 58; 359/831, 837
See application file for complete search history.

(56) References Cited
U.S. PATENT DOCUMENTS 6,053,616 A * 4/2000 Fujimori et al. ............ 353/119
6,320,709 B1 * 11/2001 Kitabayashi et al. ........ 359/831
6,565,213 B1    5/2003 Yamaguchi et al. ......... 353/33
6,834,964 B2 * 12/2004 Nishihara et al. ........... 353/52

FOREIGN PATENT DOCUMENTS

| EP | 1 073 280 A2 | 1/2001 |
|---|---|---|
| JP | A 10-10994 | 1/1998 |
| JP | A 11-95185 | 4/1999 |
| JP | A 2000-221588 | 8/2000 |
| JP | A 2001-42425 | 2/2001 |
| JP | A 2001-154264 | 6/2001 |
| JP | A 2002-23263 | 1/2002 |
| JP | A 2002-287253 | 10/2002 |

* cited by examiner

*Primary Examiner*—W. B. Perkey
*Assistant Examiner*—Andrew Sever
(74) *Attorney, Agent, or Firm*—Oliff & Berridge, PLC

(57) ABSTRACT

A prism structure that comprises of a combination of a plurality of modulators and a color-combining prism is provided, wherein light shielding means having an opening in the center are arranged between the modulators and the color-combing prism. The light shielding means allows image light to pass through the opening and blocks light from the periphery of the image light. The light shielding means allows linear stray light and spot-like stray light from the periphery of the image light to be effectively removed thereby improving image quality.

18 Claims, 12 Drawing Sheets

PRISM STRUCTURE AND PROJECTOR

BACKGROUND OF THE INVENTION

1. Field of Invention

Aspects of the invention can relate to a prism structure used in a projector and a projector.

2. Description of Related Art

FIG. 8 is a diagram of a related art optical system for a projector. In the drawing and the following description, the z-axis represents an axis along the direction of travel of light (the optical axis formed by a series of optical elements constituting an optical system). The x-axis and the y-axis represent axes that are normal to the z-axis and perpendicular to each other. As shown in FIG. 8, a projector 90 separates the light emitted from a light source 110 into three colors of light, red, green, and blue, by a color-separating optical system 200, modulates the respective colors of light by three electro-optic devices 310R, 310G, and 310B, combines them with a color combining prism 400, and projects the composite light onto a screen S, or the like, through a projector lens 420. Such related art projectors 90 widely use a prism structure 500 that is a combination of part of the components of the electro-optic devices 310R, 310G, and 310B and the color combining prism 400.

FIG. 9 is a perspective view of a related art prism structure 500, and FIG. 10 is an exploded perspective view of the related art prism structure 500. As shown in FIGS. 9 and 10, the prism structure 500 has an integrated structure in which parts of the components of the three electro-optic devices 310R, 310G, and 310B are attached to three sides of the quadratic color combining prism 400. The emerging plane of the color combining prism 400 which has not the electro-optic devices 310R, 310G, and 310B, in the rear of the drawing, is opposed to the projector lens 420.

While FIG. 10 shows the component of only the electro-optic device 310G as being exploded, the other electro-optic devices 310B and 310R have the same structure. The electro-optic device 310G can include an incident-side polarizing plate (arranged on the side of the incident light of a liquid crystal panel 311, not shown), the liquid crystal panel 311, a view-angle compensating plate 320, a fixing plate 330, and an emerging-side polarizing plate 340. Among the components, the components other than the incident-side polarizing plate are integrated with the color combining prism 400. A rectangular frame 312 that holds the liquid crystal panel 311 has pin holes 313 for transparent pins 350 to pass through at the four corners.

The fixing plate 330 is a rectangular member formed of, for example, a metal plate having a thickness of about 0.7 mm. The fixing plate 330 has an opening 331 for image light that has passed through the liquid crystal panel to pass through and a recess 332 for mounting the rectangular emerging-side polarizing plate 340 and the view-angle compensating plate 320. The fixing plate 330 also has two positioning guide holes 333 bored at the lower part.

The projector 90 can be used as a so-called data projector for projecting the screen of a personal computer onto a screen or the like at a meeting, a discussion and so on. The data projector can project high-intensity light so as to allow clear projection display even in a bright room. On the other hand, also widely used as so-called home-theater projectors which project the screen of movies and music lives onto a screen or the like at home or mini theaters. The home-theater projectors generally make projection display in a dark room.

However, when the so-called data projectors used in a bright room is used in a dark room, various problems are caused. One of them is the presence of stray light that leaks around the projection image. Although the stray light leaking around the projection image is not conspicuous when the projector is used in a bright room, it becomes conspicuous to be extremely obstructive when it is used in a dark room.

SUMMARY OF THE INVENTION

Aspects of the invention can provide a prism structure capable of constructing a projector that generates no stray light around a projection image. It is another aspect of the invention to provide a projector that generates no stray light around a projection image.

Investigation into the cause of the generation of stray light that generates around a projection image projected from a projector has been made. FIG. 11 is a diagram for explaining stray light projected around a projection image from a projector. The investigation has shown that stray light generating around a projection image P includes linear stray light 70 and spot-like stray light 72, as shown in FIG. 11.

The investigation analysis has shown that among them the linear stray light 70 is caused by the fact that partial light X1 of the light emerging from the end of the emerging-side polarizing plate 340 is taken into a projector lens and arrives on the screen, as shown in FIG. 12. There are several causes to generate the light X1. This can be proven since, for example, part of the light that has emerged from the liquid crystal panel 311 and the light that has entered from other parts, such as the transparent pins 350, are irradiated to the end of the polarizing plate 340 and are scattered. In general, the emerging-side polarizing plate 340 often includes a polarizing film 341 and a light transmissive substrate 342 to which it is adhered. In this case, the scattered light generates at the end of the light transmissive substrate 342. The light X1 is generated because part of the light passing through the light transmissive substrate 342 is reflected by the inner surface of the light transmissive substrate 342, the light transmissive substrate 342 acting as, so to speak, a light transmission path, and the light is emerged from the end face thereof. The above-described phenomena probably occur not only at the emerging-side polarizing plate 340, but also at the view-angle compensating plate 320.

It has also been discovered that, of the stray light generated around the projection image, the spot-like stray light 72 is caused because partial light X2 of the light emerging from the side of the transparent pins 350 is passed into the projector lens and projected on the screen. There are several causes of the generation of the light X2. For example, it occurs probably because the light irradiated to the light incident plane of the transparent pins 350 is reflected by the inner surface of the transparent pins 350 and part of which emerges from the side of the transparent pins 350. Also, it probably occurs because the light irradiated to the side of the transparent pins 350 is reflected toward the projector lens or enters from one position of the side of the transparent pins 350 and emerges from the other position.

The generation of stray light poses a noticeable problem in projectors that employ a so-called integrator optical system in which the light from a light source is split into a plurality of sub-beams, which is superposed on a modulator (the liquid crystal panel 311 in FIG. 12).

Since projectors that do not employ the integrator optical system can use light having an equal angle to some extent as illumination light, the generation of stray light can be prevented relatively easily. When the illumination light has an equal angle to some extent, it is easy to make the cross section of light flux for illuminating a modulator substantially equal in size with the image formation area of the modulator and let the illumination light into the modulator substantially in parallel thereto. Such an arrangement reduces the possibility of irradiating light to the end of the plate optical elements such as the emerging-side polarizing plate 340, the light transmissive substrate 342 to which the polarizing film 341 is adhered, and the view-angle compensating plate 320 and the transparent pins 350.

On the other hand, when the integrator optical system is employed, the light irradiated to the modulator can have various angles in principle, since it is almost impossible to have an equal angle. As a result, the end of the plate optical elements such as the emerging-side polarizing plate 340, the light transmissive substrate 342 to which the polarizing film 341 is adhered, and the view-angle compensating plate 320 and the transparent pins 350 are easily irradiated with light and the phenomenon can hardly be prevented.

On the basis of the findings, aspects of the invention can achieve success in effectively eliminating the linear stray light 70 and the spot-like stray light 72 described above by arranging light shielding means for blocking the light from the periphery of image light between a plurality of modulators for modulating color light from a light source and a color combining prism for combining the color light modulated by the plurality of modulators.

An exemplary prism structure of the invention can be an integration of a plurality of modulators for modulating color light from a light source and a color combining prism for combining the light modulated by the plurality of modulators. Further, a light shielding device having an opening in the center can be arranged between the modulators and the color combining prism, and the light shielding device can allow image light to pass through the opening and blocks light from the periphery of the image light. Providing the light shielding device can allow the prism structure of the invention to remove linear stray light and spot-like stray light effectively.

In the invention, image light represents light that forms a projection image. In other words, it is, of the light incident on the effective image area of the modulator and modulated, light used for forming a projection image. In the invention, light from the periphery of the image light can represent light that causes stray light around the projection image, of the light that is not used to form a projection image, light X1 or X2 which is taken into a projector lens and visually recognized as the above-described linear stray light and spot-like stray light.

In the related art shown in FIGS., 9, 10, and 12, the light from the periphery of the image light can be slightly blocked by the fixing plate 330 for fixing the liquid crystal panel 311 to the color combining prism 400. However, the opening 331 of the fixing plate 330 cannot be formed significantly larger than the image formation area of the liquid crystal panel 311 in order to mount the emerging-side polarizing plate 340 in the recess 332. This is because the outer shape of the emerging-side polarizing plate 340 is formed fairly larger than the image formation area of the liquid crystal panel 311 in order to leave a margin for alignment with the liquid crystal panel 311. Therefore, the spot-like stray light (indicated by numeral 72 in FIG. 11) that is caused by the light emerging from the side of the transparent pins 350 can hardly be removed by the fixing plate 330.

Since the fixing plate 330 is arranged on the light incident plane of the emerging-side polarizing plate 340, linear stray light (indicated by numeral 70 in FIG. 11) that is caused by the light emerging from the end of the emerging-side polarizing plate 340 or the end of the light transmissive substrate 342 having the polarizing film 341 thereon cannot also be removed. Therefore, the fixing plate 330 has no function of blocking the light from the periphery of the image light.

In the exemplary prism structure according to the invention, preferably, a plate optical element can be provided between the modulators and the color combining prism, and the light shielding device is arranged between the plate optical element and the color combining prism. With such a structure, the linear stray light 70 can be removed with more reliability.

Furthermore, preferably, the relationship $d1<d3 \leq d2$ holds, where d1 is the length in at least one of two axial directions perpendicular to the direction of light travel of an image formation area of the modulators, d2 is the length in at least one of the directions of the outer shape of the plate optical element, and d3 is the length in at least one of the directions of the opening of the light shielding device. When the relationship holds, specifically, when the opening of the light shielding device is larger than the image formation area of the modulator and is equal to or smaller than the outer shape of the plate optical element, as shown in FIG. 5, light X1 emerging from the end of the plate optical elements (in this case, the emerging-side polarizing plate 340 and the view-angle compensating plate 320) and light X2 emerging from the side of the transparent pins 350 are effectively prevented from being taken into the projector lens and arriving on the screen, so that the linear stray light and spot-like stray light can be removed more effectively.

In the exemplary prism structure of the invention, the light shielding device can be preferably formed of a frame-shaped plate member or a pair of plate members. Since the douser is formed of a frame-shaped plate member or a pair of plate members, stray light can easily be removed without changing the related art structure. The frame-shaped plate member is preferable because the stray light can be removed more reliably, the number of parts is small and the modulator and the prism can easily be aligned. However, when the effect of the stray light is exerted only in at least one of the two axial directions perpendicular to the direction of light travel, the stray light can be removed with a pair of plate members without the need for the frame-shaped plate member. The frame-shaped plate member may be made of any materials, for example, a metal plate, a resin plate, and a light transmissive member, such as a glass plate, on which a light shielding layer is formed by the vapor deposition or some other means. Particularly, a metal plate is most preferable from the viewpoint that it can easily be thinned in thickness and in terms of cost and strength.

In the exemplary prism structure according to the invention, preferably, the plate member has a slit extending from the outer rim toward the opening. With such a structure, the stress applied to the plate member can be absorbed by deformation near the slit of the plate member. Therefore, when the plate member is joined with another component made of a material having a thermal expansion coefficient different from that of the material of the plate member, the stress generated to the plate member due to the difference in thermal expansion coefficient can be absorbed by the deflection near the slit. Thus, the deviation of the joining position between the other part and the plate member can be prevented.

In the prism structure according to the invention, the plate member is preferably joined with the color combining prism. With such a structure, the light shielding device and the color combining prism can be held in a correct position.

In the exemplary prism structure according of the invention, the light shielding means is preferably a light shielding layer provided on the incident plane of the color combining prism. With such a structure, the light shielding device can be accurately formed on the color combining prism. Furthermore, the number of parts can be reduced, so that the production cost can be decreased. The light shielding layer can be achieved by a print layer, a metallized film and so on.

An exemplary projector according to the invention can include a plurality of modulators for modulating a plurality of colors of light, respectively, a color combining prism for combining the light modulated by the plurality of modulators, and a projector lens for projecting the light combined by the color combining prism. Further, a light shielding device having an opening in the center can be arranged between the modulators and the color combining prism, and the light shielding device can allow image light to pass through the opening and blocks light from the periphery of the image light. Since the projector according to the invention includes the light shielding means described above, the linear stray light and the spot-like stray light can be effectively removed by the same reason as described with respect to the prism structure.

In an exemplary projector according to the invention, preferably, a plate optical element is provided between the modulators and the color combining prism; and the light shielding means is arranged between the plate optical element and the color combining prism. With such a structure, the linear stray light 70 can be removed with more reliability.

Furthermore, preferably, the relationship d1<d3≦d2 holds, where d1 is the length in at least one of two axial directions perpendicular to the direction of light travel of an image formation area of the modulators, d2 is the length in at least one of the directions of the outer shape of the plate optical element, and d3 is the length in at least one of the directions of the opening of the light shielding device. With such a structure, the linear stray light and the spot-like stray light can be more effectively removed by the same reason as described with respect to the prism structure.

In the exemplary projector according to the invention, preferably, the light shielding device is made of a frame-shaped plate member or a pair of plate members. Since the light shielding device is made of a frame-shaped plate member or a pair of plate members, the stray light can easily be removed without changing the related art structure. The frame-shaped plate member is preferable because the stray light can be removed with more reliability, the number of parts is small and the modulator and the prism can easily be aligned. However, when the effect of the stray light is exerted only in at least one of the two axial directions perpendicular to the direction of light travel, the stray light can be removed by a pair of plate members without the need for the frame-shaped plate member. The frame-shaped plate member may be made of any materials, for example, ones formed by evaporating a light shielding film onto a light transmissive member such as a metal plate, a resin plate, and a light transmissive member, such as a glass plate, on which a light shielding layer is formed by the vapor deposition or some other means. Particularly, a metal plate is most preferable from the viewpoint that it can easily be thinned in thickness and in terms of cost and strength.

In the projector according to the invention, the plate member preferably has a slit extending from the outer rim toward the opening. With such a structure, the stress applied to the plate member can be absorbed by deformation near the slit of the plate member. Therefore, when the plate member is joined with another component made of a material having a thermal expansion coefficient different from that of the material of the plate member, the stress generated to the plate member due to the difference in thermal expansion coefficient can be absorbed by the deflection near the slit. Thus, the deviation of the joining position between the other part and the plate member can be prevented.

In the projector according to the invention, the plate member is preferably joined with the color combining prism. With such a structure, the light shielding means and the color combining prism can be held in a correct position.

In the projector according of the invention, the light shielding device can be preferably a light shielding layer provided on the incident plane of the color combining prism. With such a structure, the light shielding device can be accurately formed on the color combining prism. Furthermore, the number of parts can be reduced so that the production cost can be decreased. The light shielding layer can be achieved by a print layer, a metallized film and so on.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
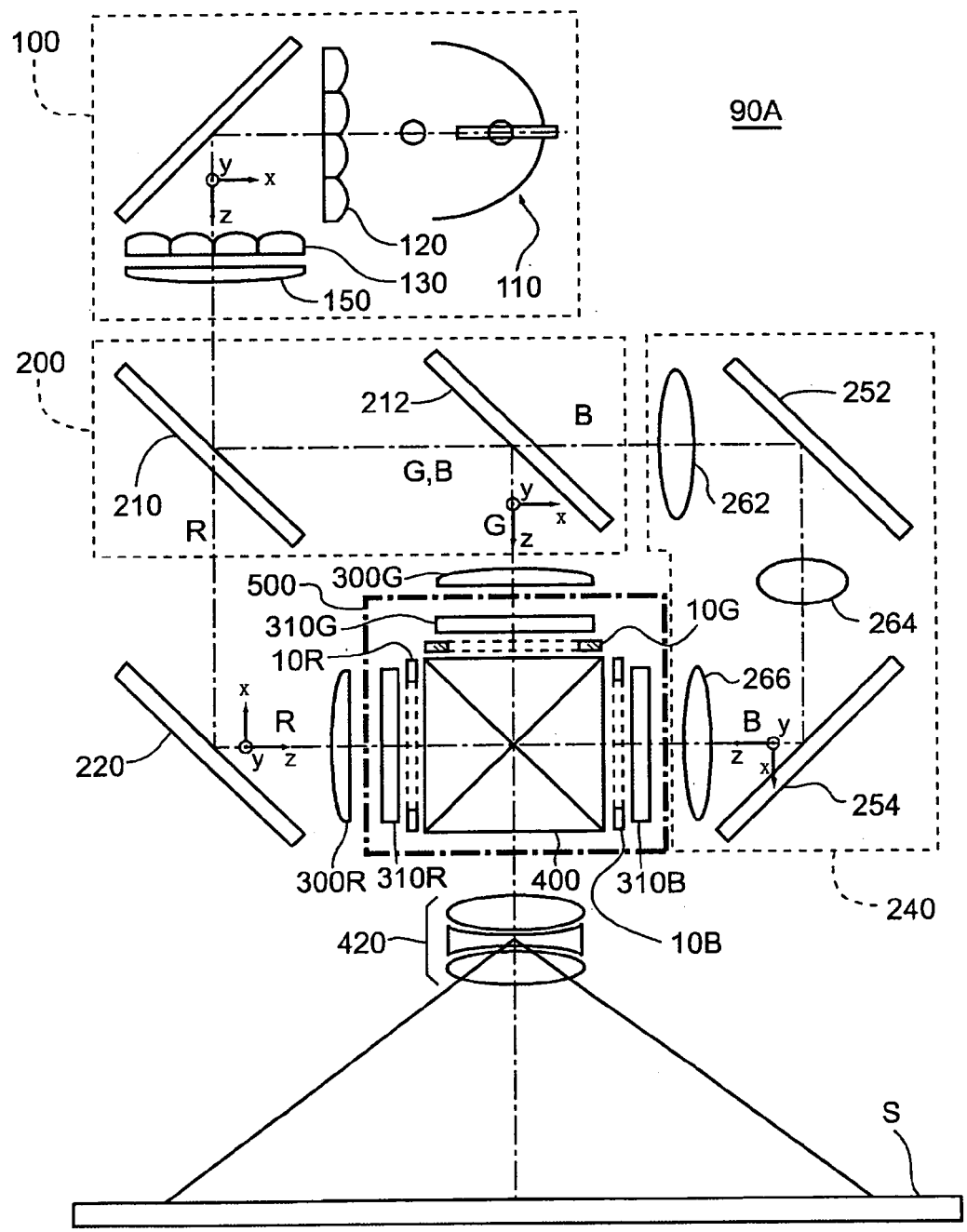
FIG. 1 is a diagram of an optical system of a projector according to an exemplary embodiment of the present invention.

FIG. 1 is a diagram of an optical system of a projector according to an exemplary embodiment of the invention. The projector 90A of the exemplary embodiment has the same structure as that of a related art projector 90 except that light shielding device 10R, 10G, and 10B are provided between the electro-optic devices 310R, 310G, and 310B and the color combining prism 400. Specifically, as shown in FIG. 1, the projector 90A of this exemplary embodiment can include an illuminating optical system 100, the color-separating optical system 200, a relay optical system 240, a reflecting mirror 220, two field lenses 300R and 300G, three electro-optic devices 310R, 310G, and 310B serving as electro-optic modulators, the color combining prism 400, and the projector lens 420 similarly to the related art projector 90. The color-separating optical system 200 can include dichroic mirrors 210 and 212. The relay optical system 240 can include reflecting mirrors 252 and 254, an incident-side lens 262, a relay lens 264, and a field lens 266.

Substantially parallel light beams emitted from a light source 110 are split into a plurality of sub-beams by a first lens array 120 constituting an integrator optical system. The sub-beams emerging from the small lenses of the first lens array 120 are condensed so as to form a light source image (a secondary light-source image) of the light source 110 near the small lenses of a second lens array 130. The sub-beams emerging from the secondary light-source image formed near the second lens array 130 are superimposed on image formation areas of the electro-optic devices 310R, 310G, and 310B by a superimposing lens 150. Thus, the electro-optic devices 310R, 310G, and 310B are illuminated substantially evenly.

The color-separating optical system 200 can include the two dichroic mirrors 210 and 212, having the function of separating the light emerging from the superimposing lens 150 into three colors of light, red, green, and blue. The first dichroic mirror 210 allows a red component of the light beams emerging from the illuminating optical system 100 to pass through and reflects a blue component and a green component. The red light that has passed through the first dichroic mirror 210 is reflected by the reflecting mirror 220, passes through the field lens 300R, and reaches the red-light liquid-crystal light valve 310R.

Of the blue light and the green light reflected by the first dichroic mirror 210, the green light is reflected by the second dichroic mirror 212, passes through the field lens 300G, and reaches the green-light electro-optic device 310G. On the other hand, the blue light passes through the second dichroic mirror 212, then passes through the relay optical system 240 including, the incident-side lens 262, the reflecting mirror 252, the relay lens 264, the reflecting mirror 254, and the field lens 266, and reaches the blue-light electro-optic device 310B. The purpose of using the relay lens system for the blue light is to prevent a decrease in light-use efficiency due to the dispersion of light or the like because the optical path of the blue light is longer than that of the other colors of light. In other words, it is for the purpose of transmitting the sub-beams incident on the incident-side lens 262 to the field lens 266 as it is.

The electro-optic devices 310R, 310G, and 310B modulate the intensity of the emerging each color light on the basis of given image information (image signals).

The color combining prism 400 has a function as a color-combining optical system for combining three colors of light to form a color image. The color combining prism 400 has a dielectric multilayer film for reflecting red light and a dielectric multilayer film for reflecting blue light in substantially an X-shape on four interfaces of the rectangular prism. The three colors of light are combined into composite light for projecting a color image by the wavelength selecting characteristic of a color-of-light reflecting film formed of the dielectric multilayer films.

The composite light formed by the color combining prism 400 is guided to the projector lens 420. The projector lens 420 has the function of projecting the composite light onto the screen S or the like to display a color image.

As described above, the related art projectors are widely using the prism structure 500 of an integration of part of the components of the electro-optic devices 310R, 310G, and 310B and the color combining prism 400. The projector of the embodiment includes the prism structure.

Figure 2:
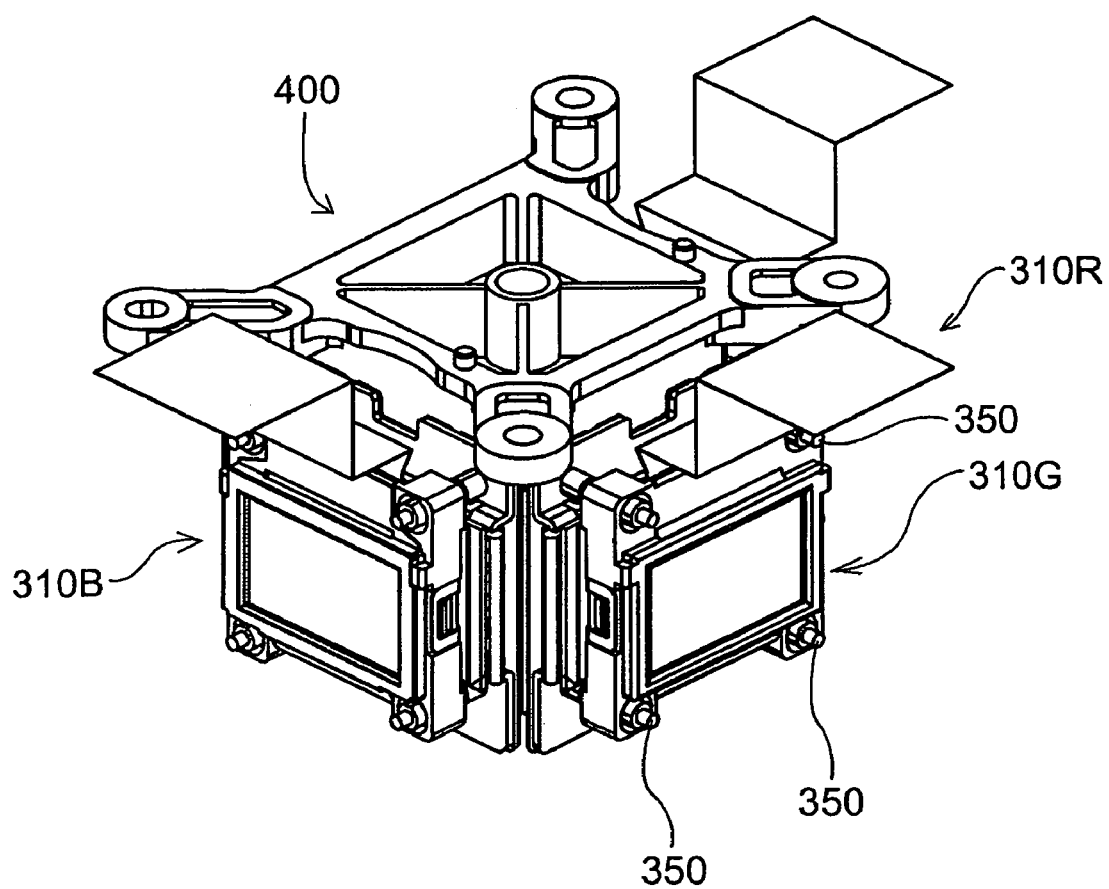
FIG. 2 is a perspective view of a prism structure according to a first exemplary embodiment of the invention.
Figure 3:
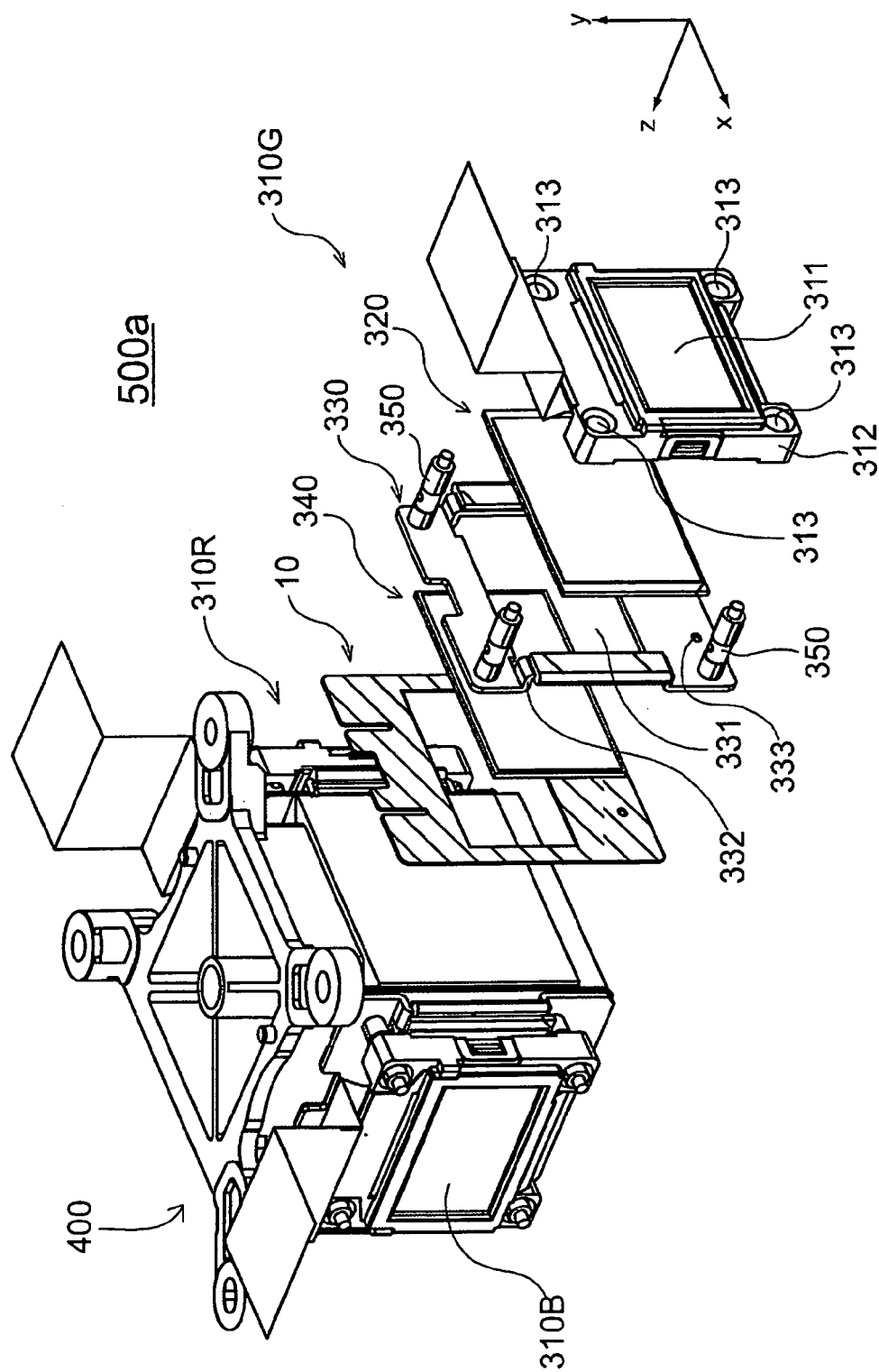
FIG. 3 is an exploded perspective view of the prism structure according to the first exemplary embodiment of the invention.

Referring to FIGS. 2 to 5, a prism structure according to a first exemplary embodiment of the invention will be described hereinafter. FIG. 2 is a perspective view of the prism structure according to the first exemplary embodiment; and FIG. 3 is an exploded perspective view of the prism structure according to the first exemplary embodiment.

As shown in FIGS. 2 and 3, the prism structure 500a according to the first exemplary embodiment has an integrated structure in which parts of the components of the three electro-optic devices 310R, 310G, and 310B are attached to three sides (incident planes) of the quadratic color combining prism 400. The side (emerging plane) of the color combining prism 400 which has no electro-optic device, in the rear of the drawing, is opposed to the projector lens 420.

FIG. 3 shows the component of only the electro-optic device 310G for modulating green light as is exploded. Since the other electro-optic devices 310B and 310R have the same structure, only the electro-optic device 310G will be described here and, for the electro-optic devices 310B and 310R, their description will be omitted. The electro-optic device 310G can include an incident-side polarizing plate (not shown), the liquid crystal panel 311 serving as a modulator, the view-angle compensating plate 320, the fixing plate 330, and the emerging-side polarizing plate 340.

The liquid crystal panel 311 has the incident-side polarizing plate (not shown) on the side of incident light, having the function of arranging the direction of polarization of light incident on the liquid crystal panel 311 in one direction. The incident-side polarizing plate can be arranged in close contact with the light incident plane of the liquid crystal panel 311 or separately in a position apart from the liquid crystal panel 311 or, alternatively, in a state in which it is adhered to a light transmissive member (a plate member or a lens) made of glass, sapphire or the like. In the exemplary embodiment, of the components of the electro-optic device 310G, only the incident-side polarizing plate is not integrated with the color combining prism 400.

The liquid crystal panel 311 can include a pair of substrates and a liquid-crystal layer sandwiched therebetween, having the function of modulating the direction of polarization of the incident light on the basis of image information. The liquid crystal panel 311 is held by the rectangular frame 312. Although a detailed description thereof will be omitted, the frame 312 is composed of a first frame for covering the periphery of the light incident plane and the side of the liquid crystal panel 311 and a second frame for covering the periphery of the light emerging plane of the liquid crystal panel 311. The first frame and the second frame are in engagement with each other to hold the liquid crystal panel 311. The frame 312 has the pin holes 313 for the transparent pins 350 to pass through at the four corners.

The fixing plate 330 is a rectangular member formed of, for example, a metal plate having a thickness of about 0.7 mm. The fixing plate 330 has the opening 331 for image light from the liquid crystal panel 311 to pass through. The fixing plate 330 also has two positioning guide holes 333 bored at the lower part. The fixing plate 330 also has the recess 332 for mounting the rectangular emerging-side polarizing plate 340 and the view-angle compensating plate 320.

The view-angle compensating plate 320 is fixed to the light incident plane of the recess 332 with a double-face tape or an adhesive. Since the modulating function of the liquid crystal panel 311 depends on the incident angle of light, the view-angle compensating plate 320 can be provided to reduce the dependency, thereby improving the quality of a projection image. However, since the view-angle compensating plate 320 is not a necessary component for the modulating function of the electro-optic devices 310R, 310G, and 310B, it can be omitted. Also, the view-angle compensating plate 320 can be arranged on the light incident plane of the liquid crystal panel 311 or, alternatively, on both of the light incident plane and the light emerging plane of the liquid crystal panel 311.

The emerging-side polarizing plate 340 has the function of selecting and transmitting only the light in a specified polarizing direction from the light modulated by the liquid crystal panel 311 and is fixed to the light emerging plane of the recess 332 with a double-face tape or an adhesive.

In this exemplary embodiment (same as a second exemplary embodiment), the view-angle compensating plate 320 and the emerging-side polarizing plate 340 are fixed by bonding to the fixing plate 330. However, they may be fixed between the fixing plate 330 and another fixing plate. The view-angle compensating plate 320 and the emerging-side polarizing plate 340 are not necessarily fixed to the fixing plate 330 and may be fixed between the liquid crystal panel 311 and light shielding device (a douser 10 or a print layer 20, which will be described later) by a certain method.

Figure 4A:
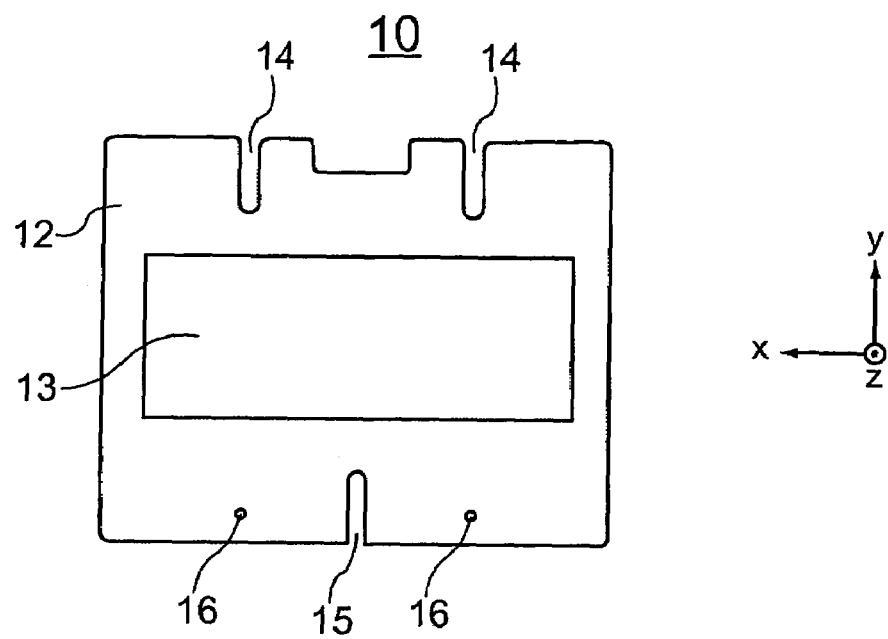
FIG. 4 is a plan view of an example of a douser used in the prism structure according to the first exemplary embodiment of the invention.

The douser 10 serving as light shielding device is a feature of the projector according to the exemplary embodiment. FIG. 4A is a plan view of the douser 10. The douser 10 is a frame 12 formed of, for example, a punched metal plate having a thickness of about 0.3 mm. The frame 12 is rectangular substantially the same as the outer rim of the side of the color combining prism 400, having a rectangular opening 13 bored in the center.

The douser 10 can have slits 14 bored extending vertically from the upper rim toward the opening 13 in two positions that divide the upper breadth of the opening 13 into substantially three parts, and also has a slit 15 bored extending vertically from the lower rim toward the upper opening 13 at the center in the lower-side portion of the opening 13. A guide hole 16 for alignment is bored on each of both sides of the lower slit 15. The slits 14 and 15 are provided to absorb a heat stress generated by the difference in thermal expansion coefficient between the glass that forms the color combining prism 400 and the metal that forms the douser 10 by the deformation of the douser 10, with the douser 10 joined with the color combining prism 400 with an adhesive. In other words, since metal can have a thermal expansion coefficient higher than that of glass, an increase in temperature in the projector causes a stress to the douser 10. If the slits 14 and 15 are not present, the stress has to be absorbed by an adhesive between the douser 10 and the color combining prism 400, and consequently, the douser 10 may be rotated with respect to the incident plane of the prism 400 or the adhesive may not withstand the stress to be pealed off. On the other hand, providing the slits 14 and 15 allows the stress to be absorbed by the deflection of the vicinity of the slits 14 and 15, thus reducing the load on the adhesive. Consequently, the deviation of the joining position between the douser 10 and the color combining prism 400 can be prevented.

An example of the method of mounting the components of the electro-optic device 310G other than the incident-side polarizing plate to the color combining prism 400 will be described. The emerging-side polarizing plate 340 and the view-angle compensating plate 320 are first bonded to the fixing plate 330 with a double-face tape or the like. Then, the douser 10 is bonded to the fixing plate 330 with an adhesive, with the emerging-side polarizing plate 340 therebetween and the respective guide holes 16 and 333 aligned to each other. Thereafter, the douser 10 is bonded to the incident plane of the color combining prism 400. The electro-optic device 310G is aligned to the fixing plate 330, and the transparent pins 350, whose end plane has an ultraviolet-curing adhesive, are inserted into the respective pin holes 313 provided in the four corners of the frame 312 of the electro-optic device 310G. Then the ends of the transparent pins 350 are brought into contact with the fixing plate 330 and weak ultraviolet light is applied through the transparent pins 350 to the ends of the transparent pins 350, thereby temporarily curing the adhesive thereon. Thereafter, light is applied to the electro-optic device 310G, and the electro-optic device 310G is aligned while a projection image is viewed and thereafter the transparent pins 350 are bonded to the lower fixing plate 330 by irradiating strong ultraviolet light. In this way, the electro-optic device 310G is mounted to the color combining prism 400 to form the prism structure, shown in FIGS. 2 and 3.

Figure 5:
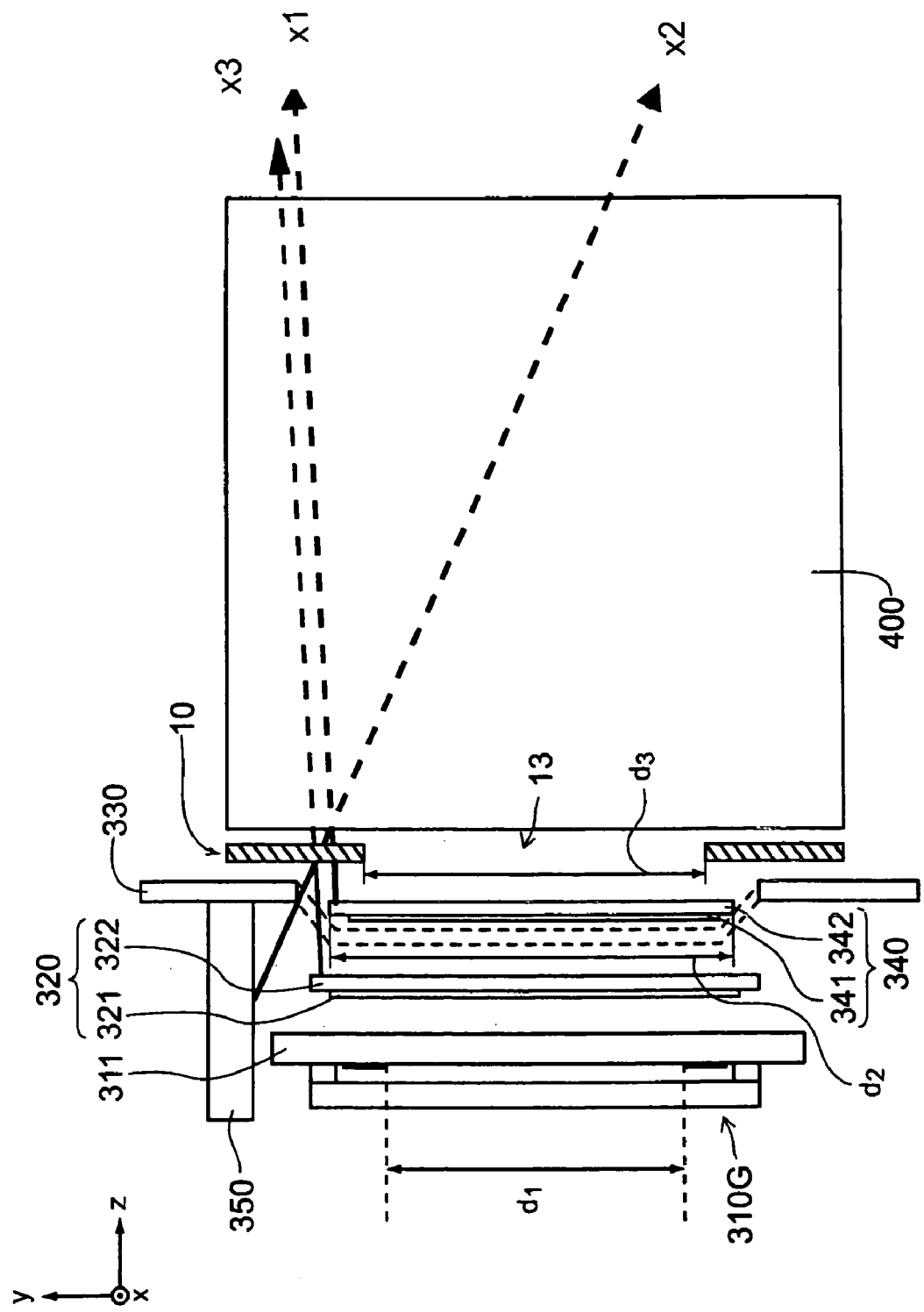
FIG. 5 is an explanatory diagram of the operation of the prism structure according to the first exemplary embodiment of the invention.

Referring next to FIG. 5, the function of the douser 10 of the exemplary embodiment will be described. FIG. 5 is a diagram for explaining the function of the prism structure 500a including the liquid crystal panel 311, the view-angle compensating plate 320, the fixing plate 330, and the emerging-side polarizing plate 340. The transparent pins 350 to be shown at the lower part of the drawing are omitted for the sake of simplicity.

Figure 11:
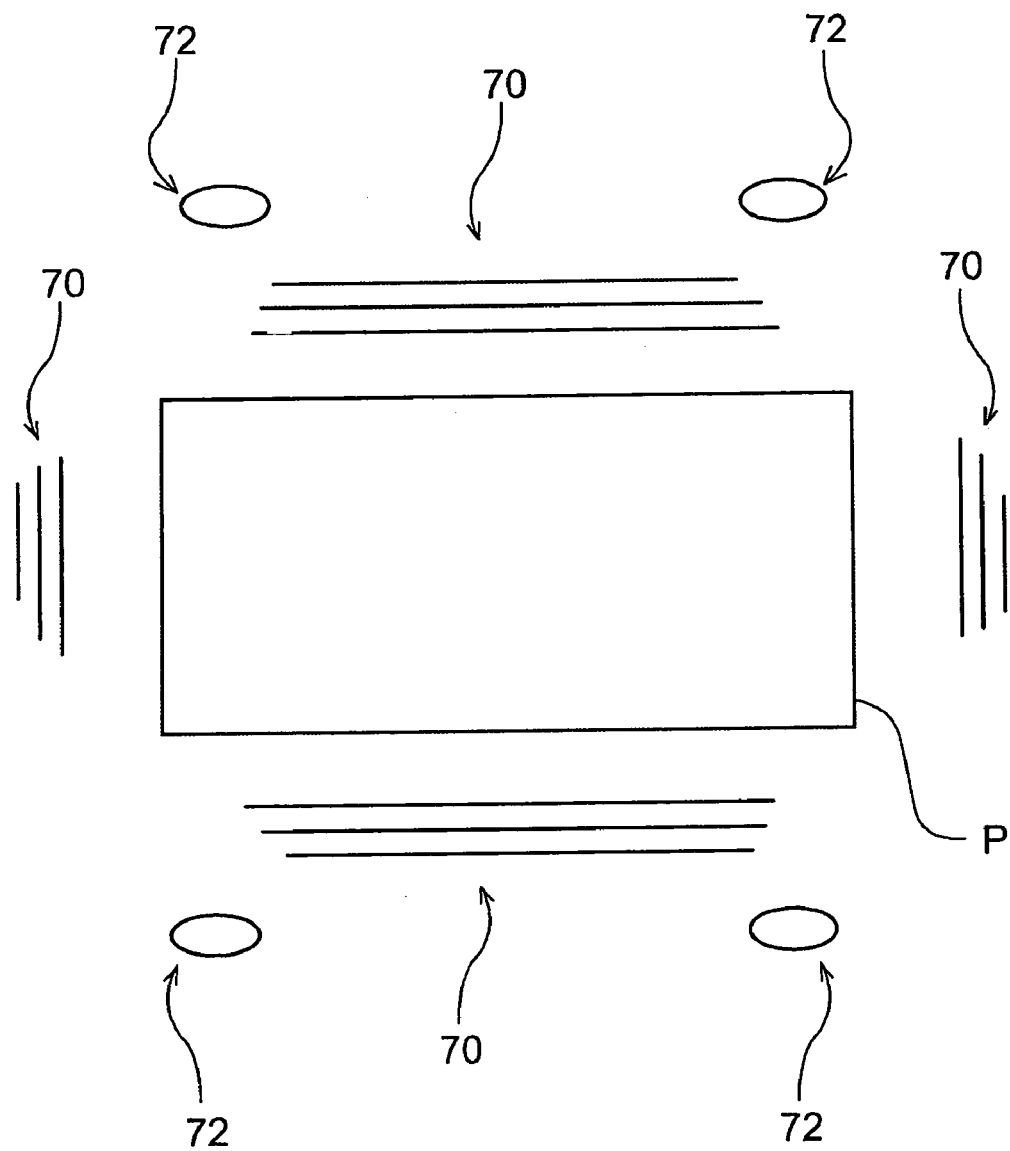
FIG. 11 is a diagram for explaining stray light generating around a projection image from a projector.
Figure 12:
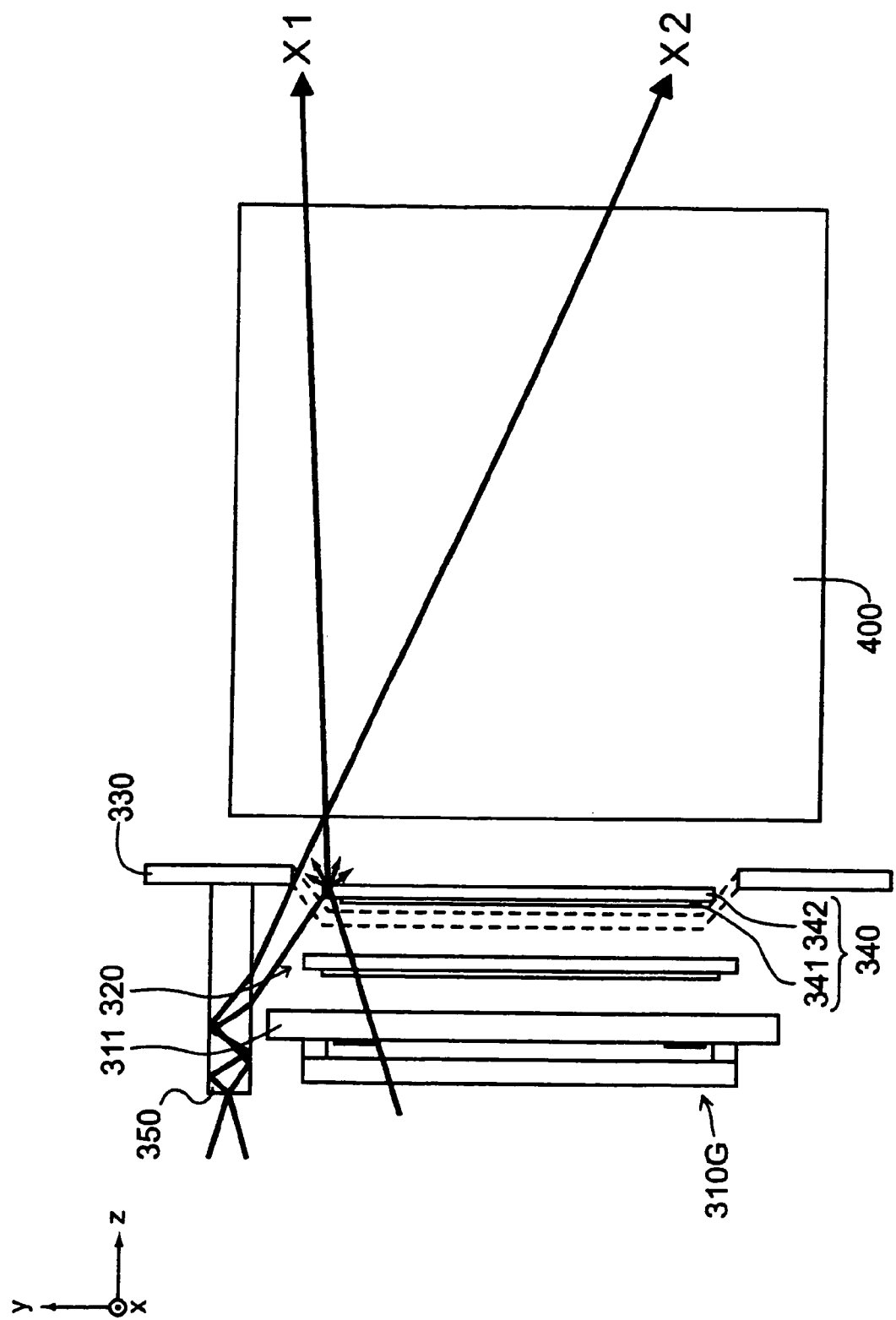
FIG. 12 is a diagram for explaining that stray light generates around a projection image in the related art prism structure.

The emerging-side polarizing plate 340 has a structure in which the polarizing film 341 can be adhered to the light transmissive substrate 342 made of glass, sapphire or the like. As described with reference to FIG. 11, the linear stray light 70 around the projection image is generated such that partial light X1 of the light emerging from the end of the light transmissive substrate 342 is taken by the projector lens and arrives on the screen. In this exemplary embodiment, however, the douser 10 can be arranged between the emerging-side polarizing plate 340 and the color combining prism 400, which effectively blocks the light X1 which generated the linear stray light 70 around the projection image, as indicated by the dashed line in FIG. 5.

The view-angle compensating plate 320 also has a structure in which a view-angle compensating film 321 is adhered to a light transmissive substrate 322. Also with the view-angle compensating plate 320, partial light X3 of the emerging light from the end of the light transmissive substrate 322 is possibly taken into the projector lens and arrives on the screen as with the emerging-side polarizing plate 340. On the other hand, this embodiment has the douser 10 arranged between the view-angle compensating plate 320 and the color combining prism 400, thus allowing also the light X3 in FIG. 5 to be effectively blocked by the douser 10.

As described before with reference to FIG. 11, the spot-like stray light 72 around the projection image is generated such that partial light X2 of the light emerging from the side of the transparent pins 350 is taken into the projector lens and arrives on the screen. On the other hand, this embodiment has the douser 10 between the liquid crystal panel 311 and the color combining prism 400; therefore, also the light X2 which generated the spot-indicated like stray light 72 around the projection image is effectively blocked by the douser 10, as by the dashed line in FIG. 5.

The relationship of the image formation area of the liquid crystal panel 311, the opening 331 of the fixing plate 330, and the outer shape of the emerging-side polarizing plate 340 will be described in terms of dimension.

In this exemplary embodiment, the opening 13 of the douser 10 is larger than the image formation area of the liquid crystal panel 311, smaller than the opening 331 of the fixing plate 330, and smaller than the outer shape of the emerging-side polarizing plate 340.

More specifically, in this exemplary embodiment, the relationship d1<d3<d2 holds in both of the x-axis direction and the y-axis direction, where d1 is the length in at least one of two axial directions (the x-axis direction and the y-axis direction) perpendicular to the direction of light travel (the z-axis direction) of an image formation area of the liquid crystal panel 311, d2 is the length in at least one of the directions of the outer shape of the emerging-side polarizing plate 340, and d3 is the length in at least one of the directions of the opening 13 of the douser 10. This relationship, however, does not necessarily need to hold in both of the x-axis direction and the y-axis direction.

As shown in FIG. 3, in this exemplary embodiment, the y-axis length of the outer shape of the emerging-side polarizing plate 340 is limited by the presence of the transparent pins 350, whereas the x-axis length can be extended to some extent without being influenced by the transparent pins 350. Thus, the x-axis length of the outer shape of the emerging-side polarizing plate 340 can be set to a length at which the influence of the stray light is negligible. In this case, there is no need to hold the above-described relationship for the x-axis length.

Figure 4B:
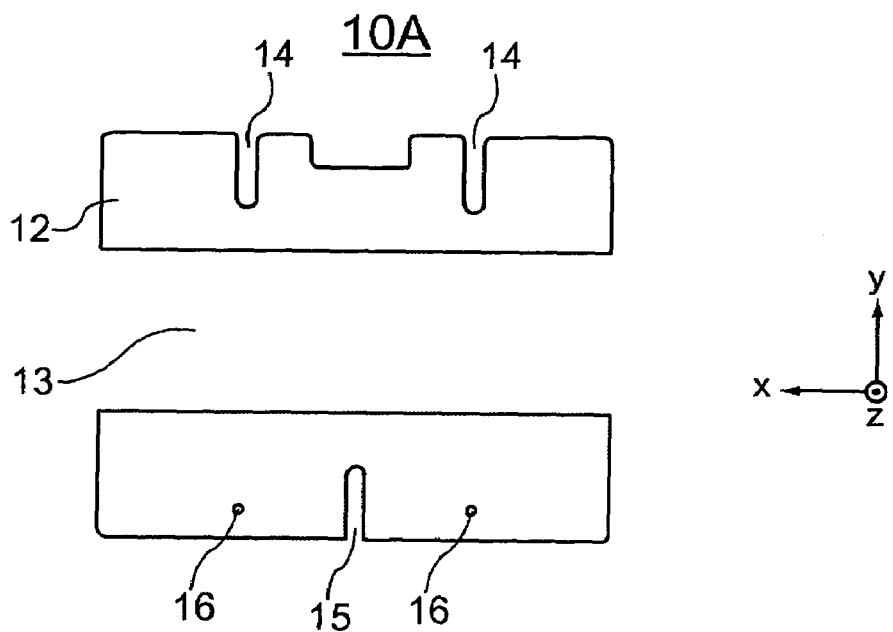

When the above relationship has only to hold in one of the x-axis direction and the y-axis direction, a douser 10A formed of two parts 12A and 12B may be used, as shown in FIG. 4B, in place of the douser 10 formed of the frame 12, shown in FIG. 4A.

Since the emerging-side polarizing plate 340 and the douser 10 are arranged in considerably close to each other, the stray light can be removed even when the lengths d2 and d3 are equal. Therefore, it is sufficient to have the relationship d1<d3≦d2.

It is also possible that a plate optical element other than the emerging-side polarizing plate 340 is provided between the liquid crystal panel 311 and the color combining prism 400, causing the linear stray light 70. In such a case, it is recommended to replace d2 with the length of at least one of the directions of the plate optical element. The plate optical element other than the emerging-side polarizing plate 340 which may cause the linear stray light 70 includes the view-angle compensating plate 320, described above, a retardation film, and a front polarizing plate provided between the liquid crystal panel 311 and the emerging-side polarizing plate 340 in order to reduce heat generation associated with light absorption of the emerging-side polarizing plate 340.

As described above, according to the exemplary embodiment, arranging the douser 10 between the liquid crystal panel 311 and the color combining prism 400 allows light X1 or X2 from the periphery of the image light to be blocked immediately after the generation. Consequently, the light can be effectively prevented from being incident on the color combining prism 400 and also the projector lens 420.

Accordingly, in the exemplary embodiment, the stray light can be effectively blocked at low cost only by adding the douser 10 without changing the components of the conventional prism structure.

Particularly, since the projector 90A employs the integrator optical system, it tends to generate noticeable linear stray light and spot-like stray light from the periphery of image light. According to this exemplary embodiment, however, even with the projector, the linear stray light and the spot-like stray light from the periphery of image light can be effectively blocked, so that the image quality can be improved.

Although this exemplary embodiment uses a metal plate as the douser 10, the douser 10 may be formed of a material other than metal. For example, it may be made of a light transmissive member such as a glass plate on which a light shielding layer is formed by the vapor deposition or some other means, or made of a resin plate: it has only to be a frame-shaped plate with a light blocking effect. However, the metal plate as used in the exemplary embodiment is most preferable from the viewpoint that it can easily be thinned in thickness and in terms of cost and strength.

Figure 6A:
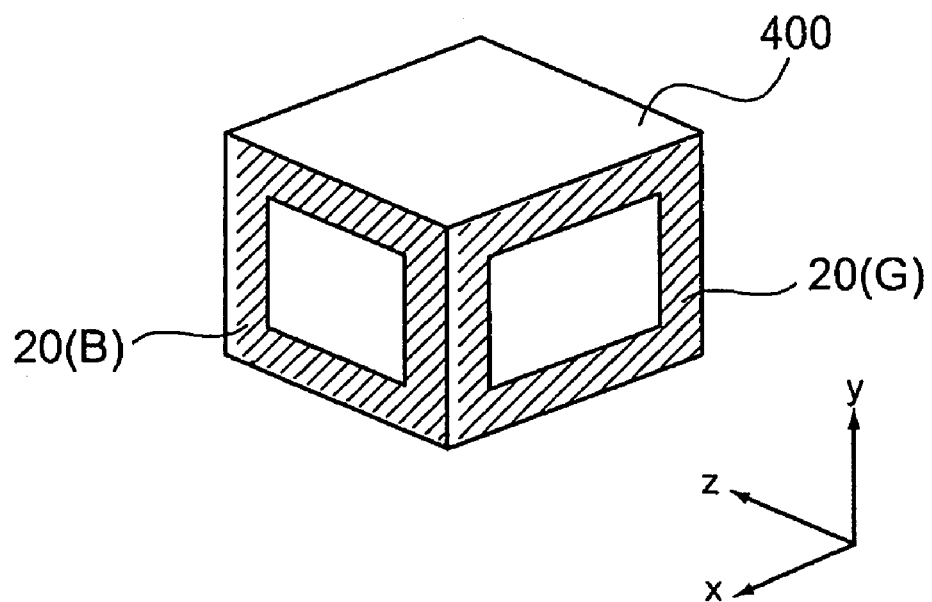
FIG. 6 is a perspective view of an example of a print layer used in the prism structure according to a second exemplary embodiment of the invention.
Figure 6B:
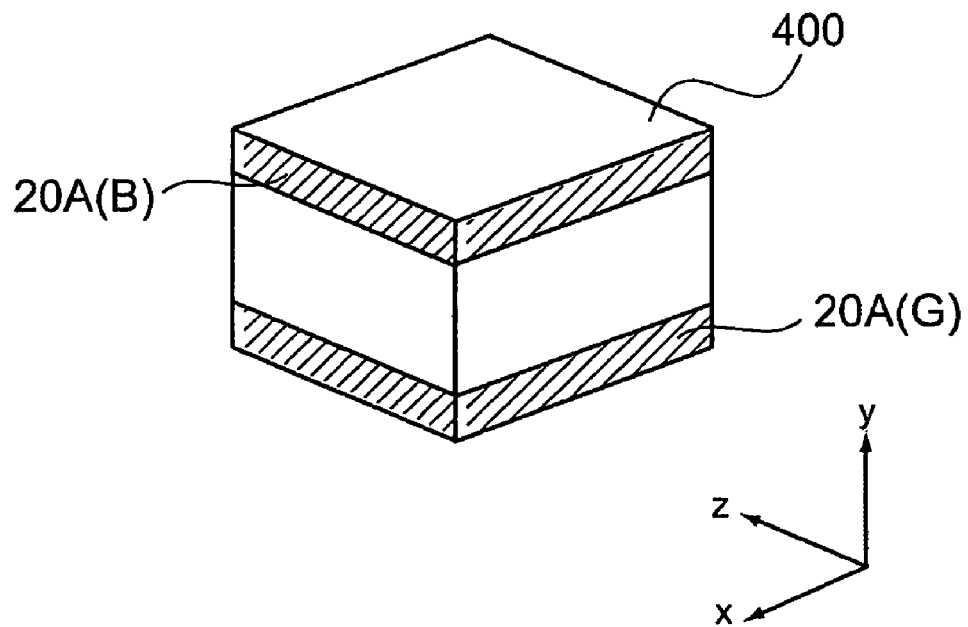
Figure 7:
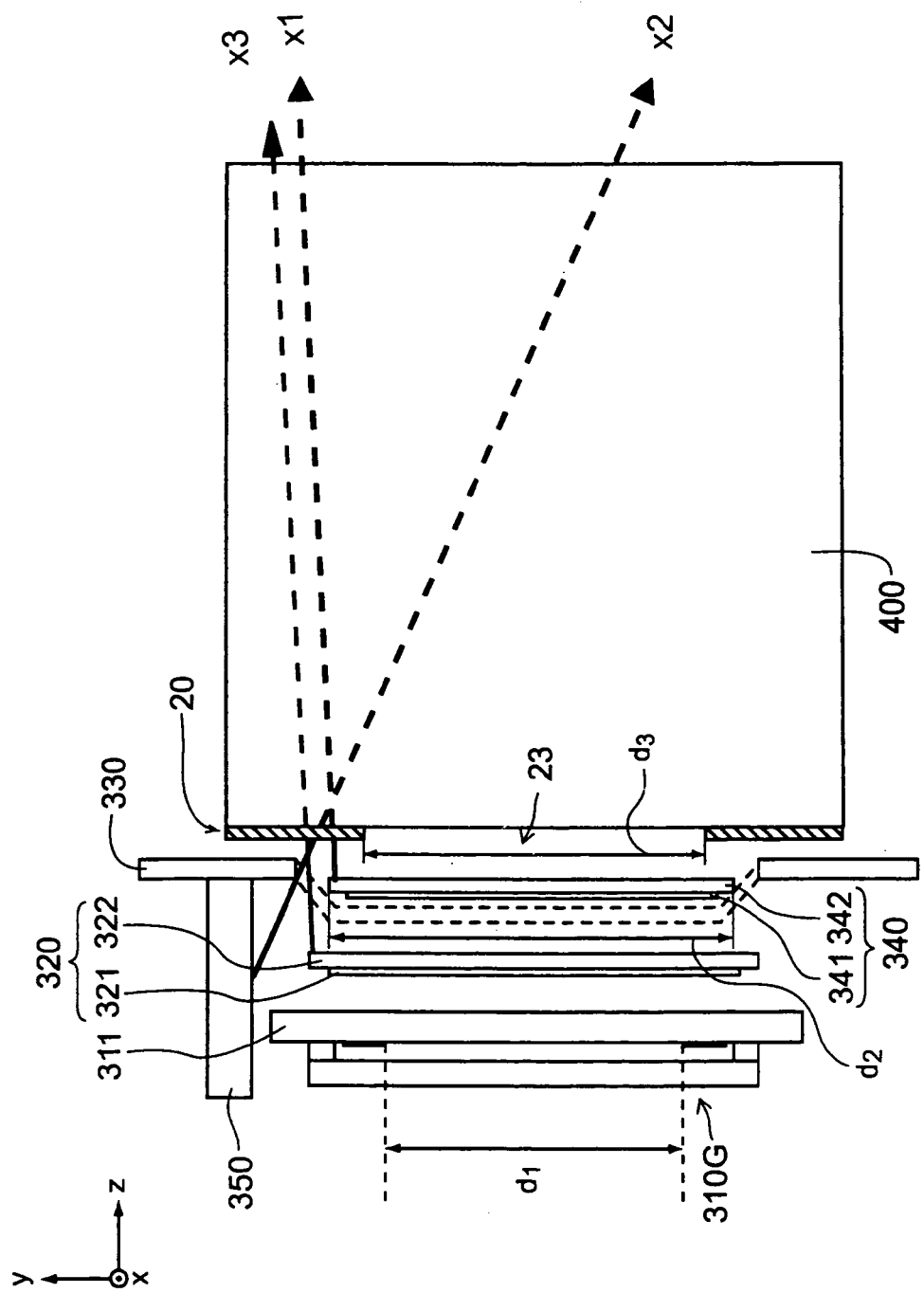
FIG. 7 is an explanatory diagram of the operation of the prism structure according to the second exemplary embodiment of the invention.
Figure 8:
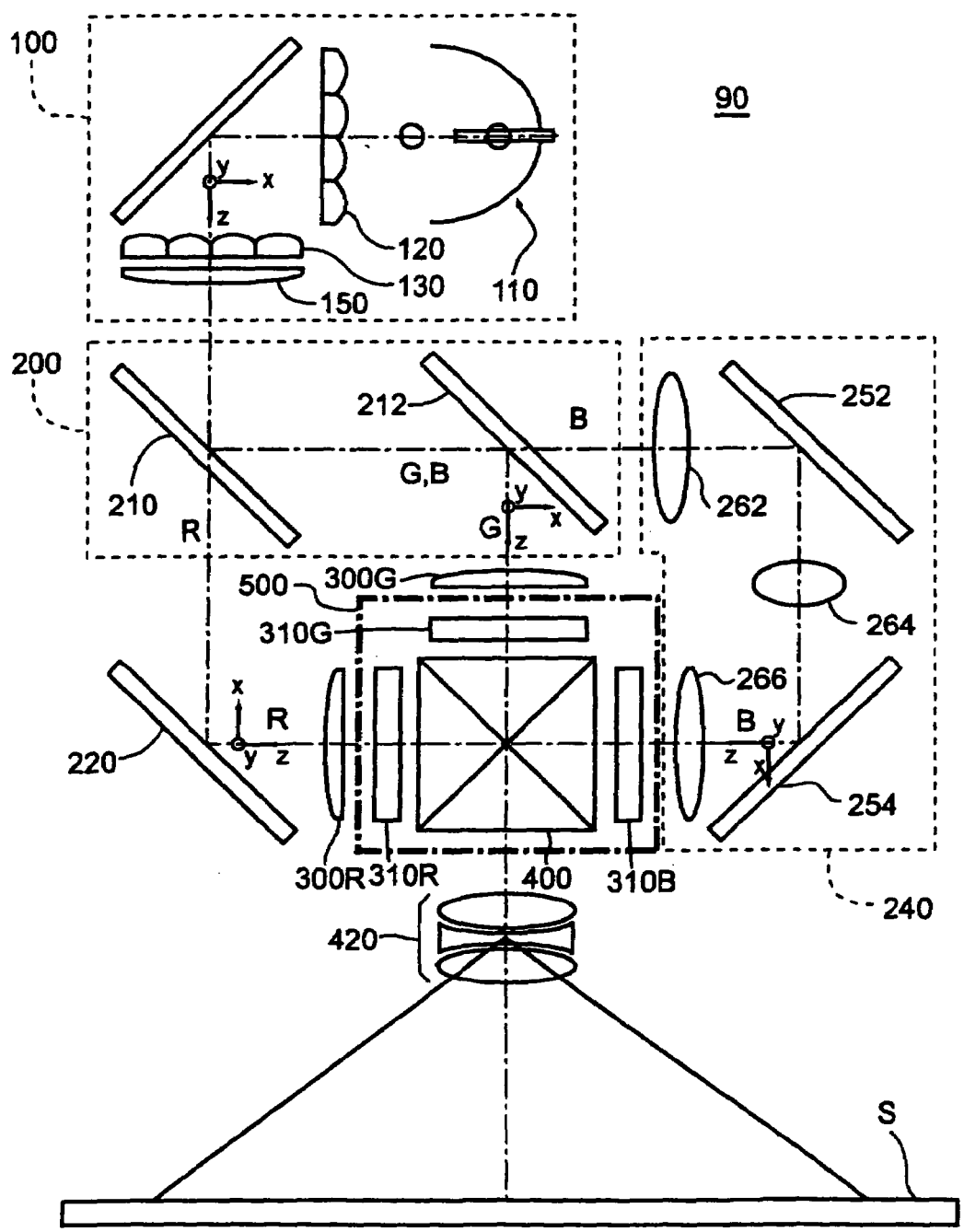
FIG. 8 is a diagram of a general optical system of a projector.
Figure 9:
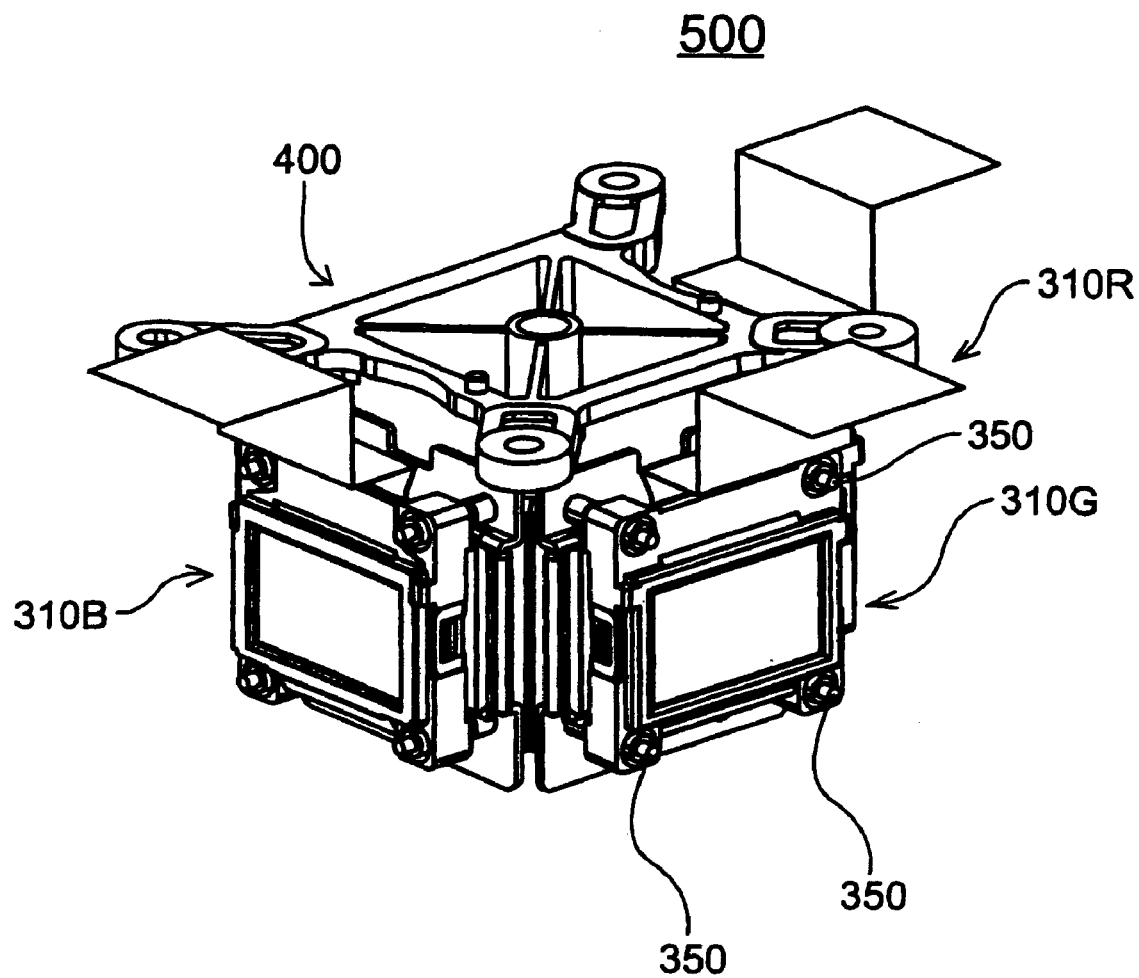
FIG. 9 is a perspective view of a related art prism structure.
Figure 10:
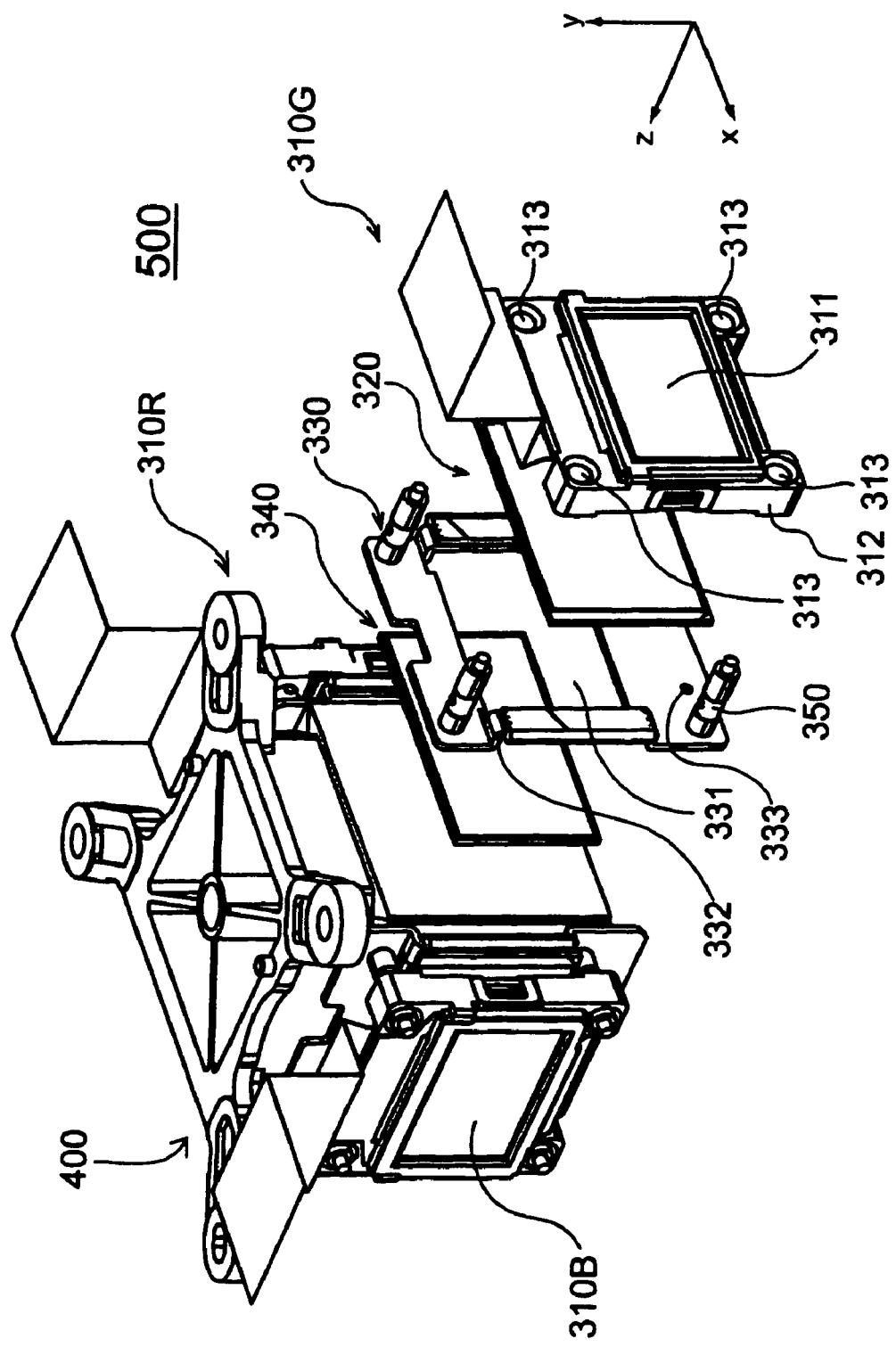
FIG. 10 is an exploded perspective view of the related art prism structure.

Referring to FIGS. 6 and 7, a prism structure according to a second exemplary embodiment of the invention will be described hereinafter. FIG. 6 is a perspective view of an example of a print layer used in the prism structure according to the second exemplary embodiment. FIG. 7 is an explanatory diagram of the function of the prism structure according to the second exemplary embodiment. In FIG. 7, the transparent pins 350 to be shown at the lower part of the drawing are omitted for the sake of simplicity.

Although the prism structure 500a according to the first exemplary embodiment uses the metal frame-shaped douser 10 as light-blocking device, the prism structure 500b according to the second exemplary embodiment has a print layer 20 on the side (incident plane) of the color combining prism 400 as the light-blocking means in place of the douser 10. The other parts are the same as those of the prism structure 500a according to the first exemplary embodiment. In the description of the exemplary embodiment and its drawings, the numerals for the description and the drawings of the first exemplary embodiment are used for components common to the first exemplary embodiment. The print layer 20 is shaped like a frame having a rectangular opening 23 that is slightly larger than the image formation area of the liquid crystal panel 311. The outer periphery of the frame substantially agrees with the outer periphery of the light incident plane of the color combining prism 400.

The print layer 20 can be formed by a screen printing method capable of thick printing with, for example, an acryl-based black ink. For example, the print layer 20 formed in the thickness of 0.03 mm by screen printing with an acryl-based black ink exhibits a sufficient light-blocking effect, thus being capable of removing the linear stray light 70 and the spot-like stray light 72 generated around the projection image.

As described above, arranging the print layer 20 between the liquid crystal panel 311 and the color combining prism 400 allows light X1 or X2 from the periphery of image light to be effectively blocked, as in the first exemplary embodiment. The print layer 20 of the second exemplary embodiment can be accurately formed on the color combining prism. Furthermore, forming the light shielding device by printing reduces the number of parts, thus decreasing production cost.

Also in the second exemplary embodiment, similar relationship to that described in the first exemplary embodiment holds for the length d1 of at least one of two axial directions (the x-axis direction and the y-axis direction) perpendicular to the direction of light travel (the z-axis direction) of the image formation area of the liquid crystal panel 311, the length d2 of at least one of the directions of the outer shape of the plate optical element such as the emerging-side polarizing plate 340, and the length d3 of at least one of the directions of the opening 23 of the print layer 20. Likewise, the above relationship has only to hold in one of the x-axis direction and the y-axis direction.

When the relationship has only to hold in one of the x-axis direction and the y-axis direction, two print layers may be formed in place of the frame-shaped print layer 20. More specifically, when the relationship needs to hold in the x-axis direction, it is sufficient to form two stripe print layers along the y-axis direction; when the relationship needs to hold in the y-axis direction, it is sufficient to form two stripe print layer along the x-axis direction (refer to FIG. 6B).

Although the exemplary embodiment uses the print layer 20 as the light-blocking device, it should be understood that it is not limited to that and may use, for example, a metallized film, a light shielding film and so on, that is, those acting as a light shielding layer.

It should also be understood that the invention is not limited to the above-described exemplary embodiments. For example, in the exemplary embodiments, the light shielding means 10R, 10G, and 10B are formed of the douser 10 or the print layer 20 with the same structure, however, the light shielding device 10R, 10G, and 10B may have different structures from one another. For example, it is also possible to construct part of the light shielding means 10R, 10G, and 10B with the douser 10, shown in FIG. 4A, and the others with the douser 10A, shown in FIG. 4B. It is also possible to construct part of the light shielding means 10R, 10G, and 10B with the douser 10 of the first exemplary embodiment and the others with the print layer 20 of the second exemplary embodiment.

In the exemplary embodiments, of the components of the electro-optic devices 310R, 310G, and 310B, the components other than the incident-side polarizing plate are mounted to the color combining prism 400. The invention, however, can be applied to a projector in which the components of the electro-optic devices are not mounted to the color combining prism. When part of the components of the electro-optic devices 310R, 310G, and 310B is mounted to the color combining prism 400, it is preferable to mount at least a modulator (the liquid crystal panel 311 in the exemplary embodiments). This is because mounting the modulator to the color combining prism facilitates holding the positional relationship among the modulator, the color combining prism, and the projector lens which have particular effects on the projection image, thus facilitating holding image quality.

Although the exemplary embodiments use the three liquid crystal panels 311, the number of the modulators is not limited to that. The invention can be applied to a prism structure and a projector which have two or more modulators.

While the projector includes one that projects from the side to observe the projection image and a so-called rear projector that projects from the side opposite to the projection-image observation side, the invention can be applied to both types.

The prism structure of the invention can prevent the stray light from the periphery of the image light from being incident on the color combining prism. Therefore, the use of the prism structure for projectors can eliminate or reduce stray light which generated around a projection image from the projector, thus improving the image quality. The projector of the invention can prevent the stray light from the periphery of the image light from being incident on the color combining prism, thus eliminating stray light which generated around a projection image to improve the image quality.

The invention claimed is:

1. A prism structure, comprising:
   an integration of a plurality of modulators that modulate color light from a light source and a color combining prism that combines the light modulated by the plurality of modulators;
   a light shielding device having an opening in a center that is arranged between the modulators and the color combining prism;
   the light shielding device allowing image light to pass through the opening and blocking light from a periphery of the image light;
   a plate optical element being provided between the modulators and the color combining prism;
   the light shielding device being arranged between the plate optical element and the color combining prism; and
   the relationship $d1<d3\leq d2$ holding, where the direction of d1, d2, and d3 are in the same axial direction, where d1 is a length in at least one of two axial directions perpendicular to a direction of light travel of an image formation area of the modulators, d2 is a length in at least one of directions of an outer shape of the plate optical element, and d3 is a length in at least one of directions of the opening of the light shielding device.

2. The prism structure according to claim 1, the light shielding device being formed of a frame-shaped plate member.

3. The prism structure according to claim 2, the plate member having a slit extending from an outer rim toward the opening.

4. The prism structure according to claim 2, the plate member being joined with the color combining prism.

5. The prism structure according to claim 1, the light shielding device being a light shielding layer provided on an incident plane of the color combining prism.

6. The prism structure according to claim 1, the light shielding device being formed of a pair of plate members.

7. A prism structure, comprising:
   an integration of a plurality of modulators that modulate color light from a light source and a color combining prism that combines the light modulated by the plurality of modulators;
   a light shielding device having an opening in a center that is arranged between the modulators and the color combining prism;
   the light shielding device allowing image light to pass through the opening and blocking light from a periphery of the image light; and
   the light shielding device being formed of a pair of plate members.

8. The prism structure according to claim 7, the plate member having a slit extending from an outer rim toward the opening.

9. The prism structure according to claim 7, the plate member being joined with the color combining prism.

10. A projector, comprising:
    a plurality of modulators that modulate a plurality of colors of light, respectively;
    a color combining prism that combines the light modulated by the plurality of modulators; and
    a projector lens that projects the light combined by the color combining prism;

a light shielding device having an opening in a center that is arranged between the modulators and the color combining prism;

the light shielding device allowing image light to pass through the opening and blocks light from a periphery of the image light;

a plate optical element that is provided between the modulators and the color combining prism;

the light shielding device being arranged between the plate optical element and the color combining prism;

the relationship $d1<d3\leq d2$ holding, where the direction of $d1$, $d2$, and $d3$ are in the same axial direction, where $d1$ is a length in at least one of two axial directions perpendicular to a direction of light travel of an image formation area of the modulators, $d2$ is a length in at least one of directions of the outer shape of the plate optical element, and $d3$ is a length in at least one of directions of the opening of the light shielding device.

11. The projector according to claim 10, the light shielding device being made of a frame-shaped plate member.

12. The projector according to claim 11, the plate member having a slit extending from an outer rim toward the opening.

13. The projector according to claim 11, the plate member being joined with the color combining prism.

14. The projector according to claim 10, wherein the light shielding device being a light shielding layer that is provided on an incident plane of the color combining prism.

15. The projector according to claim 10, the projector including the light shielding device made of a pair of plate members.

16. A projector, comprising:

a plurality of modulators that modulate a plurality of colors of light, respectively;

a color combining prism that combines the light modulated by the plurality of modulators; and a projector lens that projects the light combined by the color combining prism;

a light shielding device having an opening in a center that is arranged between the modulators and the color combining prism;

the light shielding device allowing image light to pass through the opening and blocks light from a periphery of the image light; and the projector including the light shielding device made of a pair of plate members.

17. The projector according to claim 16, the plate member having a slit extending from an outer rim toward the opening.

18. The projector according to claim 16, the plate member being joined with the color combining prism.

* * * * *